G. W. WILLIS.
DOUBLE DISK HARROW.
APPLICATION FILED MAR. 26, 1915.

1,245,295.

Patented Nov. 6, 1917.

Witnesses:
T. M. Daggett.
W. A. Loftus

Inventor.
George W. Willis.
by _____ Atty.

UNITED STATES PATENT OFFICE.

GEORGE W. WILLIS, OF AUBURN, NEW YORK, ASSIGNOR TO INTERNATIONAL HARVESTER COMPANY OF NEW JERSEY, A CORPORATION OF NEW JERSEY.

DOUBLE-DISK HARROW.

1,245,295.  Specification of Letters Patent.  Patented Nov. 6, 1917.

Application filed March 26, 1915. Serial No. 17,120.

*To all whom it may concern:*

Be it known that I, GEORGE W. WILLIS, a citizen of the United States, residing at Auburn, in the county of Cayuga and State of New York, have invented certain new and useful Improvements in Double-Disk Harrows, of which the following is a full, clear, and exact specification.

This invention relates to double disk harrows. My object is to improve and simplify the operation and construction of such devices.

Heretofore in the construction of harrows where overlapping gangs are employed, it has been difficult to overcome the tendency of the machine to draw to one side. It is, of course, advantageous to have the gangs overlap in order to cultivate or harrow all portions of the soil, leaving no ridges as where the gangs are not overlapping. Accordingly, I have provided a new arrangement of the gang members in a double disk harrow where the disks are made to overlap and in which all tendency of the harrow to draw to one side is eliminated.

One form which my invention may assume is exemplified in the following description and illustrated in the accompanying drawing, in which—

Figure 1:
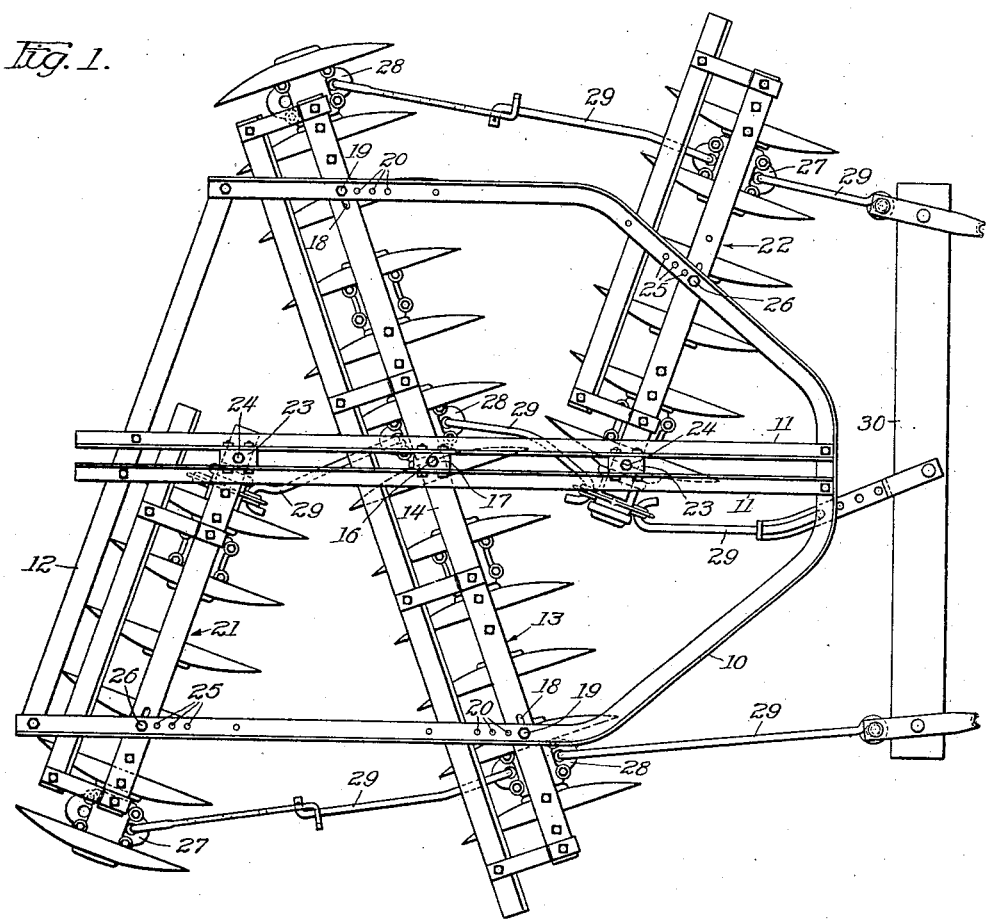
Figure 1 shows a plan view of a harrow embodying my invention.
Figure 2:
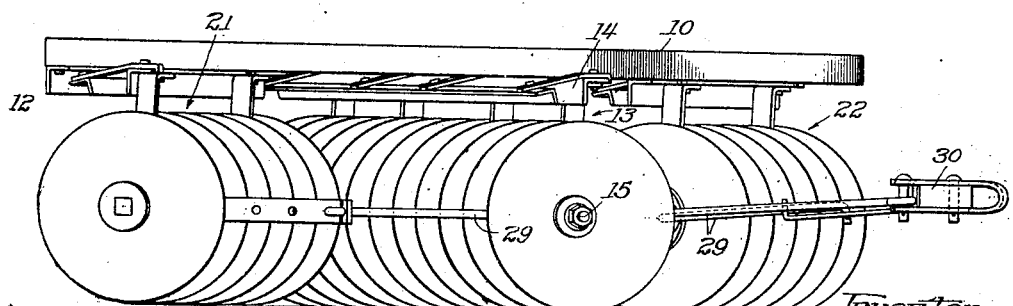
Fig. 2 shows a side elevation of the same.

In the form shown herewith I have provided a main frame 10, constructed preferably of angle bar, and arranged in substantially A-shape. Central longitudinal frame bars 11 are also provided, these being spaced apart a slight distance, and connected at their forward ends to the apex of the main frame, and at their rear ends supported on a transverse frame bar 12 extending between the rear ends of the main frame. Arranged centrally on this frame is a gang member 13, extending transversely thereof beyond either side of the main frame. It comprises a gang frame 14 carrying a shaft 15, on which are mounted one-way disks, and, as shown, there are preferably an uneven number of these disks, the middle one being arranged in the exact center of the main frame. A vertical pivotal member 16 is arranged centrally on the gang frame 14 and is carried in a bearing block 17 fitted between the spaced bars 11. Near each end of the gang frame is provided a slot 18 adapted to receive a bolt or other connecting means 19 carried by the outer sides of the main frame. A series of openings 20 in each of the outside frame bars is provided for each of these connecting means to permit adjustment of the gang relative to the line of draft. Fore and aft of the centrally arranged gang just described are two disk gangs 21 and 22 of approximately one-half the length of the former, and these are arranged in offset relation extending from the central draft line of the main frame outwardly. The disks of these gangs have their concavities arranged to turn the soil in a direction opposite to the throw of the central gang members. Bearing blocks 23, carried also between the spaced bars 11, receive the pivotal members 24 of these shorter gangs, and spaced openings 25 are provided in the outer sides of the main frame at diagonally opposite corners to receive the connecting means 26 for adjusting the gangs on their vertical pivots.

In practice the long centrally arranged gang is adjusted so that it extends diagonally of the main frame and, as shown, this member acts to throw the soil in one direction. The shorter gangs are adjusted to occupy oppositely directed angles from the central gang, being themselves relatively parallel, and operate to throw the soil in a direction opposite to the central gang. Connecting plates 27 are arranged on each end of the gang members 21 and 22, and similar plates 28 are provided at each end and centrally upon the long gang member 13. Draft links 29, longitudinally adjustable, connect the adjacent ends of the gang members to each other and to a forward draft bar 30.

With the harrow in operation and the gang members arranged substantially as shown, the tendency of the outer end of the front gang member will be to dip, whereas its inner end will rise slightly. With the long central gang member the dip or suction will occur on the end opposite that of the forward gang member, and similarly the tendency to rise from the ground will take place on the end adjacent. In the case of the rear shorter gang member the rising tendency takes place on the outer end, while on its inner end the tendency is to dip. It will thus be seen that the rising and falling action of the gangs will be neutralized and, on account of the rigid frame construction and relative arrangement of the gangs, considerable downward stress will be thrown upon the central longitudinal bars 11, tending thereby to hold the inner end of the forward gang member and the central disks of the long gang member to their work, and as a result the disks which meet first with the soil will be prevented from rising out of the ground. The gangs obviously may be adjusted to assume positions at right angles to the line of draft for the purpose of transporting the harrow, but in practice I have found it advantageous to employ transport trucks so that the angles of the gangs may be left undisturbed after once being set.

It is obvious that I have obtained the maximum simplicity in the construction and design of this harrow, and, as will be seen, all parts of the soil over which it passes will be thoroughly disked and no uncultivated ridges will be left as in the case of double disk harrows employing the cruciform arrangement of the gang. The fore and aft gang members employ the same number of disks as are carried on each side of the central disk of the long gang member. The cutting angles of all the disks are the same, and, obviously, the harrows will balance perfectly with respect to draft. The central disk of the long gang member, it will be seen, is equally disposed on each side of the central draft line, thereby having no tendency to pull one way or the other.

While I have shown and described but one form and arrangement of my harrow, it is understood, nevertheless, that it is capable of other modifications. Therefore, varying forms may be resorted to without departing from the spirit of my invention, as disclosed in the appended claims.

What I claim as my invention, and desire to secure by Letters Patent, is:

1. In a harrow, a centrally arranged member, and three diagonally arranged disk gangs having an overlapping relationship and pivotally connected thereto, two of said gangs being offset.

2. In a double disk harrow, a frame, a central disk gang, and fore and after offset disk gangs of shorter lengths, all of said gangs being associated with said plane.

3. In a double disk harrow, a frame, disks carried centrally thereon for throwing the soil in one direction, and disks carried in offset relation fore and aft of said central disks for turning the soil in an opposite direction, all of said disks being associated with said frame.

4. In a double disk harrow, a frame, a centrally, angularly arranged disk gang, and shorter angularly arranged disk gangs carried fore and aft of said central gang in parallel relation.

5. In a double disk harrow, a frame, a transversely arranged disk gang mounted centrally thereon and adjustable about a vertical pivot, and shorter disk gangs carried on said frame at diagonally opposite corners and adjustable about vertical pivots.

6. In a disk harrow, a main frame including longitudinally extending central bars, a disk gang pivoted centrally to said bars and extending transversely beyond the frame, and disk gangs pivoted to said central bars fore and aft of said central pivot and extending in opposite directions.

7. In a disk harrow, a main frame including outer frame bars and centrally arranged frame bars, a disk gang pivoted centrally to said central bars and extending transversely beyond the frame, disk gangs pivoted to said central bars fore and aft of said central pivot and extending in opposite directions, all of said gangs being adjustable angularly on vertical pivots through connections with said outer frame bars.

8. In a double disk harrow, a frame, a central disk gang connected thereto, and fore and aft offset disk gangs also connected to said frame.

9. In a multi-disk harrow, a central frame member, disks carried by said member for turning soil in one direction, and disks carried in offset relation on different sides of said first mentioned disks for turning the soil in an opposite direction whereby the disks have an interbalancing action for a given depth of ground treatment.

10. In a multi-disk harrow, a centrally arranged frame member, and three disk gangs having an overlapping relationship and pivoted to said frame at points in the same straight line parallel to the line of draft two of said disk gangs being offset.

In testimony whereof I affix my signature, in the presence of two witnesses.

GEORGE W. WILLIS.

Witnesses:
LYDIA ROLL,
HARRY WHITEFIELD.